(12) United States Patent
Grafe et al.

(10) Patent No.: US 12,037,197 B2
(45) Date of Patent: Jul. 16, 2024

(54) LOADING DEVICE AND METHOD FOR LOADING A CONTAINER WITH PACKAGES

(71) Applicants: Wolfram Grafe, Elmenhorst (DE); Bernd Hartmann, Grafschaft-Leimersdorf (DE)

(72) Inventors: Wolfram Grafe, Elmenhorst (DE); Bernd Hartmann, Grafschaft-Leimersdorf (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/490,926

(22) Filed: Sep. 30, 2021

(65) Prior Publication Data
US 2022/0097973 A1   Mar. 31, 2022
US 2023/0103273 A9   Mar. 30, 2023

(30) Foreign Application Priority Data

Sep. 30, 2020   (DE) .......................... 102020125503.9

(51) Int. Cl.
*B65G 11/08*   (2006.01)
*B65G 11/02*   (2006.01)
(Continued)

(52) U.S. Cl.
CPC .......... *B65G 11/203* (2013.01); *B65G 11/023* (2013.01); *B65G 65/32* (2013.01); *B65G 2201/0235* (2013.01)

(58) Field of Classification Search
CPC ....... B65G 11/08; B65G 11/20; B65G 11/023; B65G 11/203; B65G 65/32; B65G 69/16; B65G 69/165; B65G 2201/0235
(Continued)

(56) References Cited

U.S. PATENT DOCUMENTS 3,565,225 A * 2/1971 Fay ...................... A01D 46/243
                                                                                   193/7
4,476,670 A * 10/1984 Ukai ...................... B65G 69/16
                                                                                    193/7
(Continued)

FOREIGN PATENT DOCUMENTS

AT           401633 B    10/1996
CN        106429527 A    2/2017
(Continued)

OTHER PUBLICATIONS

U.S. Appl. No. 17/486,581, filed Sep. 27, 2021, Hartmann et al.

*Primary Examiner* — Douglas A Hess
(74) *Attorney, Agent, or Firm* — Reinhart Boerner Van Deuren P.C.

(57) ABSTRACT

A loading device for loading a container with packages, comprising a transport channel for transport of the packages in the direction of the container. The transport channel has an upper inlet to supply packages into the transport channel and a lower outlet to supply packages into the container. At least one upper, and at least one lower, finger position each with at least one finger element are provided in the transport channel. The at least one of the finger elements of the upper and lower finger positions in each case have at least two flexible flank elements extending from one end to the opposing end of the finger element. In each case, the at least two flexible flank elements are flexibly connected via a plurality of webs. The finger elements in each case may be adjusted from at least one curved position into at least one extended position and back.

15 Claims, 8 Drawing Sheets

(51) Int. Cl.
*B65G 11/20* (2006.01)
*B65G 65/32* (2006.01)

(58) Field of Classification Search
USPC .......................................................... 193/32
See application file for complete search history.

(56) References Cited

U.S. PATENT DOCUMENTS

| | | | |
|---|---|---|---|
| 5,800,112 A | 9/1998 | Stafford | |
| 5,911,667 A * | 6/1999 | Sanchis ................ | B65G 11/086 |
| | | | 198/534 |
| 6,578,696 B2 * | 6/2003 | Faes ........................ | G07F 1/047 |
| | | | 194/351 |
| 9,969,554 B2 * | 5/2018 | Hartmann ............. | B65G 11/203 |
| 10,035,657 B2 * | 7/2018 | Hartmann ............... | B65G 21/14 |
| 10,919,702 B1 * | 2/2021 | Berta .................... | B65G 11/203 |
| 2011/0091292 A1 | 4/2011 | Bryan, Jr. et al. | |
| 2017/0096301 A1 | 4/2017 | Hartmann et al. | |

FOREIGN PATENT DOCUMENTS

| | | |
|---|---|---|
| DE | 102015116720 A1 | 4/2017 |
| DE | 102016109313 A1 | 11/2017 |
| EP | 3725713 A1 | 10/2020 |
| FR | 1456034 B | 9/1966 |
| WO | WO 2006/108486 A1 | 10/2006 |

\* cited by examiner

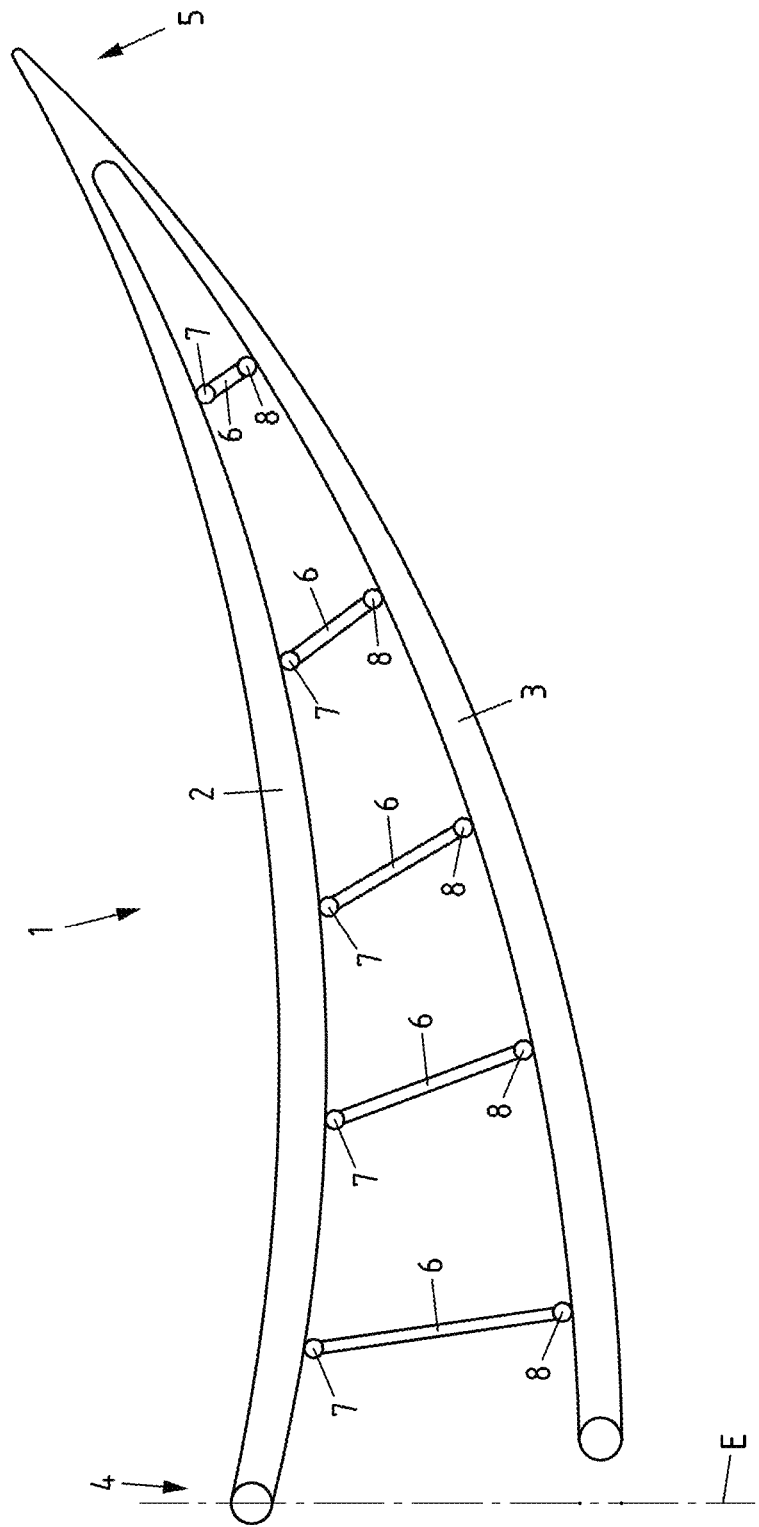

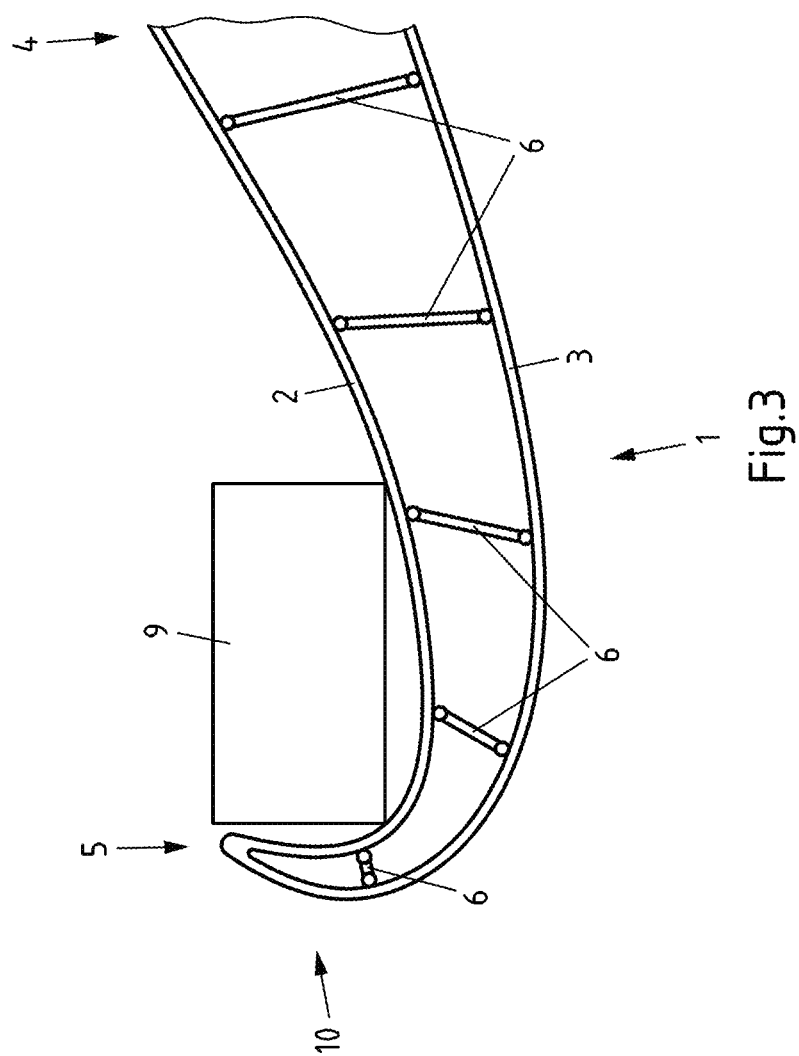

LOADING DEVICE AND METHOD FOR LOADING A CONTAINER WITH PACKAGES

FIELD OF THE INVENTION

The invention relates to a loading device for loading a container, in particular roll container, with packages. The invention further relates to a method for loading a container, in particular roll container, with packages using such a loading device.

BACKGROUND OF THE INVENTION

Containers, such as for example roll containers, are generally manually loaded with packages in order to be able to utilize the loading space of the container effectively. This applies, in particular, when packages of different dimensions are to be loaded into a container. Additionally, the manual loading of the containers with packages has the advantage that the loading may take place in a gentle manner for the packages to the loaded. This is very important since the packages may be damaged when incorrectly handled and for cost reasons are not configured to be sufficiently stable and robust that larger forces acting on the packages are able to be reliably tolerated.

The packages may also be guided via a tube to the corresponding container, wherein the packages then drop into the corresponding container after exiting from the tube. If the drop height of the packages is too great, damage to the packages may not be excluded. In order to avoid possible damage to the packages, therefore, it has already been proposed to restrict the inclination of the tube at least in some regions, in order to reduce the speed at which the packages exit from the tube and drop into the container.

In the present case, containers are understood to mean, in particular, those which may be loaded more or less from above and/or which are primarily provided for use at a business premises. The use of the containers usually does not require a separate drive of the containers, for the movement thereof on the business premises. However, in order to be able to move the containers in a simple manner, whether manually or via a separate drive unit, it is advantageous, in particular, if the containers have rollers. Such containers are often also denoted as roll containers. Irrespective thereof, the corresponding containers are also regularly transported from one business premises to another business premises. To this end, the containers are then loaded into a utility vehicle and, as required, driven via the public road network to another business premises and unloaded again there. In this case, for the simple loading and unloading of the utility vehicle it is also advantageous if the containers are configured as roll containers.

The preferred containers, in particular roll containers, are provided for unloading via one side of the containers as required, whilst the loading of the containers may take place both from the side and from above. In this case, the side of the container provided for loading and unloading may be closed by at least one door or at least one flap. In many cases, however, the packages are prevented from inadvertently dropping out by straps, belts or aprons which may be tensioned across the lateral opening of the container. These straps, belts or aprons may be preferably opened for the loading and unloading. The straps, belts or aprons in many cases are also tensioned in an approximately horizontal direction over the opening of the container. The upper face of the container may also be entirely or partially closed, but this is not necessary in principle.

A loading and/or unloading of the containers, however, does not have to be possible via one side of the containers. In principle, such containers which have merely one upper opening which is closeable as required are sufficient. In this case, such containers are particularly preferred if they are configured as roll containers, so that the containers may be moved via a plurality of rollers along the substrate. The containers, however, may also manage without rollers and, for example, may be borne by a pallet. Additionally, containers made of different materials, for example cardboard or so-called wire mesh crates are considered. Moreover, the containers may have different horizontal cross sections, for example a rectangular, pentagonal, hexagonal or octagonal cross section. Not least, the containers do not have to have any fixed side walls in the conventional sense. Thus, for example, so-called big bags which may be held in a separate holder are also considered.

The object of the present invention is to design and develop the loading device and the method, in each case of the type mentioned in the introduction and described in more detail above, such that the loading of the containers with packages may be carried out in a simpler and more expedient manner, without excessive drawbacks having to be taken into account regarding possible damage to the packages. These and other advantages of the invention, as well as additional inventive features, will be apparent from the description of the invention provided herein.

BRIEF SUMMARY OF THE INVENTION

This object is achieved according to Claim 1, by a loading device for loading a container, in particular roll container, with packages, comprising a transport channel for the transport of the packages one after the other in the direction of the container, wherein the transport channel has an upper inlet for the supply of the packages into the transport channel and a lower outlet for the supply of the packages into the container, wherein at least one upper finger position with at least one finger element and at least one lower finger position with at least one finger element are provided in the transport channel, wherein the at least one of the finger elements of the upper finger position and the lower finger position in each case have at least two flexible flank elements extending together from one end of the finger element to the opposing end of the finger element, and wherein in each case the at least two flexible flank elements of the finger elements are flexibly connected together in each case via a plurality of webs, so that the finger elements in each case may be adjusted from at least one curved position into at least one extended position and back.

The aforementioned object is also achieved according to Claim 11, by a method for loading a container, in particular roll container, with packages, with a loading device according to Claim 1, in which the packages are introduced one after the other into the upper inlet of the transport channel, in which the packages introduced into the inlet of the transport channel come into contact with the at least one finger element of the upper finger position and are braked by the at least one finger element, in which the packages braked by the at least one finger element of the upper finger position come into contact with the at least one finger element of the lower finger position and are braked by the at least one finger element and in which the packages braked by the at least one finger element of the lower finger position are released from the transport channel into the container through the lower outlet of the transport channel.

According to the invention, a transport channel through which the packages are transported in the direction of the container is provided. In this case, the transport channel is preferably provided such that gravity is utilized for the transport of the packages, so that an additional drive for the transport of the packages is superfluous. The transport channel in this case is provided for the transport of the packages one after the other, which however does not mean that a plurality of packages are not able to be received at the same time in the transport channel. In principle, a plurality of packages may also be transported together through the transport channel as required. Then, however, further packages are transported together or separately through the transport channel before or afterwards. Thus, a transport of the packages one after the other will always be provided, at least relative to sections of the total number of packages to be loaded into a container.

The packages to be loaded may be previously sorted or combined in a different manner. Preferably, the packages are transported by a conveying device to the transport channel. In this case for the sake of simplicity, in particular, a belt conveying device is advantageous. In order to be able to provide a high degree of flexibility for the location for loading the containers, it is advantageous if the belt conveying device is a telescopic belt conveying device. Moreover, a conveying device in the form of a sorter which separates a partial flow of packages from a flow of packages and feeds said partial flow of packages to the transport channel is advantageous. The packages are introduced in principle via an upper inlet into the transport channel and thus supplied thereto. After the packages have passed through the transport channel, the packages emerge again from the transport channel at a lower outlet of the transport channel and thus enter the container in which the lower outlet of the transport channel is preferably arranged. The outlet of the transport channel in this case is provided in the direction of gravity below the inlet, so that gravity may ensure a transport of the packages from the inlet to the outlet through the transport channel.

Along the transport channel at least two different finger positions are provided along the transport path of the packages, wherein the finger positions are provided along the transport channel and on different planes in the direction of gravity. Thus at least one upper finger position and one lower finger position are present. The finger positions have in each case at least one finger element, wherein in each case a plurality of finger elements is preferred. Additionally, the at least one finger element will preferably protrude with its free end into the transport channel. This finger element may be arranged with the opposing end of the finger element on an edge and/or a wall of the transport channel and fixed there as required. A wall of the transport channel, in particular, is a wall defining the transport channel outwardly. In this case, the transport channel does not have to be fully closed on the peripheral side. The openings should not become too large, however, so that the packages remain in the transport channel and do not inadvertently drop out of this channel to the side. The packages may thus come into contact with the fingers of the finger positions when transported through the transport channel, wherein the packages may be braked and/or deflected as a result of this contact.

Regarding the finger elements, the invention makes use of the so-called fin ray effect in order to be able to load packages having very different dimensions expediently and without damage into the container, as required. The finger elements in each case thus have at least two flexible flank elements extending together from one end of the finger element to the opposing finger element. In this case, it is advantageous, in particular, if the flank elements form the upper face and the lower face of each finger element so that the packages are always grasped by a flank element. However, this is not absolutely necessary. The flexible flank elements of each finger element, however, are flexibly connected together via a plurality of webs so that the finger elements obtain the required flexibility in order to be able to be adjusted from at least one curved position into at least one extended position and back. In this case, it is particularly expedient if the finger elements are able to be curved and extended again in a stepless manner. Then the finger elements may adopt different curved positions and namely in each case specifically as is suitable for grasping and unloading a specific package.

The so-called fin ray effect may be observed in tail fins of bony fish. If a finger is pressed to the side against these tail fins, the fins do not bend away but flex against the finger. This is made possible by a specific construction of the fins. This is correspondingly recreated in the finger elements of the at least one hand element.

The required flexibility of the finger elements may be provided, for example, by resilient flank elements or by a link chain made of rigid chain links connected together in a pivotable or articulated manner. In this case, a corresponding flexibility is only required in one spatial direction. In the spatial directions a flexibility is not absolutely necessary perpendicular thereto. However, a flexibility in two spatial directions located perpendicular to one another might also be conceivable and even preferred as required. The corresponding flexibility of the flank elements ultimately permits a curvature of the finger element starting from an extended position into a curved position, for example similar to the curvature of a finger.

So that the curvature of the finger element may be triggered in one direction, for example by pressing against the finger element, in particular against a flank element in the opposing direction, the at least two flank elements are connected flexibly together, in each case between the two ends of the finger element via a plurality of webs. In this case the webs may be configured rigidly or connected in a pivotable or articulated manner to the flank elements. However, as an alternative to pivotable or articulated connections to the at least two flank elements, flexible in particular resilient, webs may also be used as required. In this manner it is achieved that the webs may pivot relative to the at least two flank elements in order to permit in this manner a curvature of the finger element from an extended position into a curved position and back.

An extended position of the finger element may be understood to mean a maximum extended and/or elongated orientation of the finger element. However, it may also be a position from which the finger element may be adjusted by a further curvature into a further curved position relative to the extended position. Accordingly, the curved position does not have to be a maximum curved position. Thus, the terms extended position and curved position may be understood to mean merely relatively, i.e., as relative positions to one another as required. Moreover, it has to be considered that the finger elements may be adjusted into different curved positions from an extended position in an opposing direction.

Due to the corresponding construction a finger element ultimately permits an adaptation of the shape to the shape of the packages coming into contact with the finger elements, when the finger elements press against the package and/or vice versa. Thus, on the one hand, a greater bearing surface of finger element and package may be provided, which may have a positive effect on the handling of the packages in the transport channel. The construction of the finger element, however, also permits a precurvature to be set as required, without a contact being present between the finger element and the at least one item of goods. To this end, for example, the flank elements may be adjusted relative to one another in the longitudinal direction of the finger element. In this case the finger element then curves away from the flank element which is adjusted further in the longitudinal direction to the opposing end of the finger element relative to the at least one further flank element. If a package now comes into contact with the correspondingly precurved finger element, the curvature of the finger element may change due to the corresponding contact which expediently may have an effect on the further transport of the package coming into contact with the finger element, for example in the path of a braking or a deflection of the package due to the variation in the curvature.

In order to be able to adjust the finger element, for example not only in one plane, the finger element may have, for example, three or more flank elements which relative to one another are connected together via webs. In this case, the webs may be configured, for example, to be cross-shaped, star-shaped, rectangular, square, oval or round, in order to be able to be able to be fixed in a simple manner to all of the flank elements. The corresponding connections in this case are preferably either pivotably or rotatably configured and/or the webs are flexibly configured.

Packages are understood to mean, as required, a particular type of items of goods. Packages may thus be goods packed with packaging. Packages may thus have at least one wrapper made of paper, cardboard, woven fabric or plastics and, for example, be present as packets, boxes and containers as well as non-dimensionally stable containers, such as bags or sacks.

The containers are preferably roll containers and provided for unloading via one side of the containers as required, whilst the loading of the containers may take place both from the side and from the top. The side of the container provided for the loading and unloading in this case may be closed by at least one door or at least one flap. In many cases, the packages may be prevented from inadvertently dropping out by straps, belts or aprons, which may be tensioned across the lateral opening of the container. These straps, belts or aprons may be preferably opened for the loading and unloading. Additionally in many cases the straps, belts or aprons are tensioned approximately in the horizontal direction over the opening of the container. The upper face of the container may also be entirely or partially closed, but this is not required in principle.

A loading and/or unloading of the containers, however, does not have to be possible via one side of the containers. In principle, such containers which have merely one upper opening which is closable as required are sufficient. In this case, such containers are particularly preferred if they are configured as roll containers, so that the containers may be moved via a plurality of rollers along the substrate. The containers, however, may also manage without rollers and for example may be borne by a pallet. Additionally containers made of different materials, for example cardboard or so-called wire mesh crates, are considered. Moreover, the containers may have different horizontal cross sections, for example a rectangular, pentagonal, hexagonal or octagonal cross section. Not least, the containers do not have to have any fixed side walls in the conventional sense. Thus, for example, so-called big bags which may be held in a separate holder are also able to be considered.

For the sake of improved clarity and to avoid unnecessary repetition, the loading device and the method for loading the container are described together hereinafter, without in each case differentiating specifically between the method and the device. However, it is revealed to the person skilled in the art by the context which feature is particularly preferred in each case regarding the method and the device.

In a first particularly preferred embodiment of the loading device, a plurality of finger elements are provided on at least one finger position. As a result, the packages reliably come into contact with at least one finger element of the respective finger position. Moreover, the movement of the packages may be influenced more accurately and efficiently via the plurality of finger elements. Here at least two, preferably at least three, in particular at least four, also in particular at least five, finger elements are advantageous. The exact number may depend on the size and/or the diameter of the transport channel. Additionally, the improved handling of the packages is countered by a greater expense in terms of equipment.

In principle, however, it is preferred if at least one hand element, which in turn comprises at least some of the finger elements of the plurality of finger elements of the respective finger position, is provided on at least one finger position. Since a plurality of finger elements are combined to form at least one hand element, the handling of the packages in the transport channel is possible in an even more effective and targeted manner than with individual finger elements. The packages may thus be handled in an improved and more gentle manner as required, wherein the principles of handling packages by the human hand may be adapted. Thus the individual finger elements of the hand element may be moved substantially separately from one another and yet not entirely independently of one another. For example the finger elements may be more or less curved and/or spread out, wherein as a result of the fin ray effect the finger elements may partially surround adjacent packages which may result in a gentle braking of the packages during the transport through the transport channel. This influencing of the movement path and/or transport path of the packages in this case may be easily implemented depending on the size and/or weight of the respective packages. This is similar to the behavior of a human hand.

The finger elements of the at least one hand element may be arranged slightly spreading from one another to the side or running at least substantially parallel to one another. As a result, it is possible to ensure a reliable contact between the finger elements and the packages, which at the same time may lead to an expedient influence of the movement of the packages through the transport channel. Alternatively or additionally, the finger elements of the at least one hand element may be provided to act together on a hand surface element of the hand element. Thus not only the relatively flexible finger elements but also, in relative terms, the more stiff and stable hand surface element may be used for influencing the movement of the packages.

For the more targeted adjustment of the at least one finger element of at least one finger position and/or of at least one hand element of at least one finger position, a drive unit may be assigned to the corresponding finger element and alternatively or additionally to the corresponding hand element. The drive unit thus serves for adjusting the at least two flank elements of the respective finger element in a longitudinal direction of the finger element relative to one another from a curved into an extended position and/or back. Thus at least one finger element of at least one finger position may be adjusted in a targeted manner via the drive unit. Since in principle a targeted adjustment of finger elements may be preferred, in such a case it is advantageous if at least one drive unit is assigned to all of the finger elements of at least one finger position and/or at least one hand element as required. The drive unit thus serves for adjusting the at least two flank elements of the respective finger elements in a longitudinal direction of the finger element relative to one another from a curved into an extended position and/or back.

If at least one finger element of at least one finger position and/or at least one hand element and/or the hand element itself is assigned a pressure sensor, this may be used to detect the pressure which the packages exert on the finger element and/or hand element. This pressure correlates with the mechanical loads acting on the packages. The pressure sensor may thus be used to control the finger elements such that the loads on the packages remain small and the packages are not damaged. This may be very effectively achieved if the at least one pressure sensor is assigned to at least one flank element of at least one finger element. Thus the pressure on a specific flank element may be detected. In principle, a detection of the pressure may also be used to influence in a targeted manner the movement of the packages in a suitable but variable manner, depending on the size and weight thereof. The transport of the packages through the transport channel may thus take place in a very targeted manner.

So that the packages reliably come into contact with the finger elements in the different finger positions while the packages are transported through the transport channel, it is advantageous if the finger positions are arranged offset not only in the direction of gravity but also laterally and/or over the periphery. Thus the extension of the at least one finger element and/or hand element of a finger position in the direction of the associated free end may form an angle of between 45° and 315°, preferably between 90° and 270°, in particular between 135° and 225° relative to the extension of a finger element and/or hand element of a further finger position in the direction of the associated free end. For determining the corresponding angle, the corresponding directions may be projected into a common plane, wherein it is advantageous if this plane is a horizontal plane and/or a cross-sectional plane of the transport channel since this at least substantially takes into account the transport direction of the packages along the transport channel. In a particularly preferred embodiment of the transport channel, the finger elements of at least the upper finger position and the lower finger position are provided opposing one another in the transport channel. The finger elements thus extend in opposing directions so that the previously described angle is at least substantially 180°.

It may be further preferred in this case if the finger elements, in each case of successive finger positions in the direction of gravity, are provided opposing one another and extending in opposing directions. Thus the extension of the finger elements and/or hand elements of, in particular in each case all, successive finger positions in the direction of gravity in the direction of the associated free end enclose an angle of between 45° and 315°, preferably between 90° and 270°, in particular between 135° and 225°. It is also advantageous here for determining the corresponding angle of the corresponding directions if these directions are in each case at least projected into a common plane. For the described reason it is also advantageous if this plane is a horizontal plane and/or a cross-sectional plane of the transport channel.

Alternatively or additionally, in this context the finger elements and/or hand elements of, in particular successive, finger positions spaced apart from one another in the direction of gravity, are preferably provided on at least substantially opposing inner faces of the transport channel.

So that the packages when transferred from the transport channel into the container are not damaged, a spacing between the lower finger position and/or lowermost finger position of the transport channel above the lower outlet of the transport channel and the outlet of the transport channel in the direction of gravity of less than 2 m, preferably less than 1.5 m, in particular less than 1 m, further in particular less than 0.5 m, is advantageous. The lower this height is, in principle, the smaller the effective drop height of the packages when dropped into the container. At the same time, with a significant reduction in this spacing, a large structural effort may be required, for example when a further finger position is required in order not to allow the spacing between the finger positions to become too great.

For structural simplification and for a more expedient transport of the packages through the transport channel, the transport channel, in particular a central line of the transport channel, may be configured to be at least substantially rectilinear. Thus the transport of the packages is not inadvertently stalled, whereby the effectiveness of the transport channel may be increased. Alternatively or additionally, the transport channel, in particular a central line of the transport channel, may have an average angle to the direction of gravity of less than 45°, preferably of less than 30°, in particular of less than 15° as required. Then the packages slip quickly through the transport channel without being damaged at the same time or when transferred into the container.

For protecting the packages during the transport through the transport channel it may also be advantageous if the transport channel is configured at least as an at least substantially closed channel, in particular having at least a substantially rectangular or round cross section. Alternatively or additionally, a funnel-shaped section tapering in particular in the direction of gravity and/or in the transport direction of the packages along the transport channel may be assigned to the upper inlet of the transport channel. This may simplify and accelerate the supply of packages without resulting in the risk of significant damage to the packages.

In a first particularly preferred embodiment of the method, the direction of movement of the packages is deflected at least by the finger elements of the upper finger position and/or the lower finger position. Since the packages are transported at least partially in the direction of gravity, it is advantageous if the packages are deflected in this case at least partially in a direction perpendicular to the direction of gravity. Here a transport at least partially in the direction of gravity is understood to mean a transport downwardly. The direction of movement of the packages thus has at least one movement component in the direction of gravity. Accordingly, a deflection of the movement of the packages is understood to mean a change to the movement of the packages which manipulates the movement component of the packages in a horizontal direction. Moreover, the transport of the packages through the transport channel may take place particularly uniformly when the packages are deflected by at least one finger element and/or hand element of the at least one upper finger position in the direction of the at least one finger element and/or hand element of the at least one lower finger position. Thus this permits a suitable manipulation of the direction of movement of the packages by the finger elements of both finger positions. In the case of further finger positions, the packages may be guided in each case by the finger elements of a finger position to the finger elements of respectively the next finger position in the direction of gravity.

In order to brake and/or deflect the packages, it may be advantageous if the packages are also captured at least partially by the at least one finger element and/or hand element of at least one finger position. In this case it does not have to be a complete capture of the packages in which the packages at least come to rest in the direction of gravity. It is sufficient if the packages are captured by the at least one finger element such that the speed of the packages in the direction of gravity is significantly reduced. As a result it may be achieved that the speed of the packages, viewed in the region of the finger positions, as a whole is not significantly increased or is at least substantially maintained as required. Thus in this region of the transport channel, as required, it does not lead to a significant acceleration of the packages which would be present if the packages were to pass through the transport channel without finger elements. Alternatively or additionally, however, the deflection and/or forwarding of the packages along the transport channel may take place by an adjustment of the at least one finger element of the finger position and/or the hand element of the at least one finger position. For the sake of simplicity, the adjustment of the at least one finger element in this case may be caused by the contact with the packages themselves, which makes a corresponding control of the finger elements superfluous. However, for the purposes of the targeted control of the movement of the packages along the transport channel it may also be provided that the finger elements are adjusted by at least one corresponding drive means. In this case this adjustment may be carried out such that the finger elements are additionally adjusted by the contact with the packages, if this is expedient. An adjustment, whether active or passive, may be understood to mean an adjustment downwardly, upwardly and/or a spreading of a plurality of finger elements of the finger position and/or the hand element of the finger position.

The transfer of the packages from the transport channel to the container to be loaded may take place expediently by the packages which exit from the lower outlet of the transport channel dropping into the container, in particular roll container, in the direction of gravity. In this case the corresponding drop height should not be too great so that the packages are not damaged. In principle, however, in this manner no further handling of the packages is required.

In order to ensure a suitable transfer of the packages from the transport channel to the container, for the sake of simplicity, during the loading of the container a lower section of the transport channel assigned to the lower outlet of the transport channel may be held at least temporarily in a position inserted into the container. At least in the case of empty or only slightly filled containers, the packages then do not drop sufficiently far in free fall downwardly that the packages might be at risk of damage. So that the transport channel does not hinder the loading of the container with packages, however, it may be further provided that during the loading of the container the lower section of the transport channel is at least temporarily and at least partially pulled out of the container. The pulling out thus does not have to take place during the entire loading process. It is sufficient if this only takes place in a specific time interval. Moreover, the lower section of the transport channel does not have to be pulled entirely out of the container. This applies, in particular, when the container does not have to be or is not intended to be loaded completely up to the top. According to the method, in the above-described context it is particularly simple if the lower section of the transport channel is pulled out in a stepwise manner from the container. This is able to be implemented in a simpler manner in terms of control and/or control system technology.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 2A-2C show the functional principle of the finger element of FIG. 1 when adjusting the flank elements relative to one another, FIG. 3 shows the functional principle of the finger element of FIG. 1 with the auto-adaptive adjustment of a flank.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
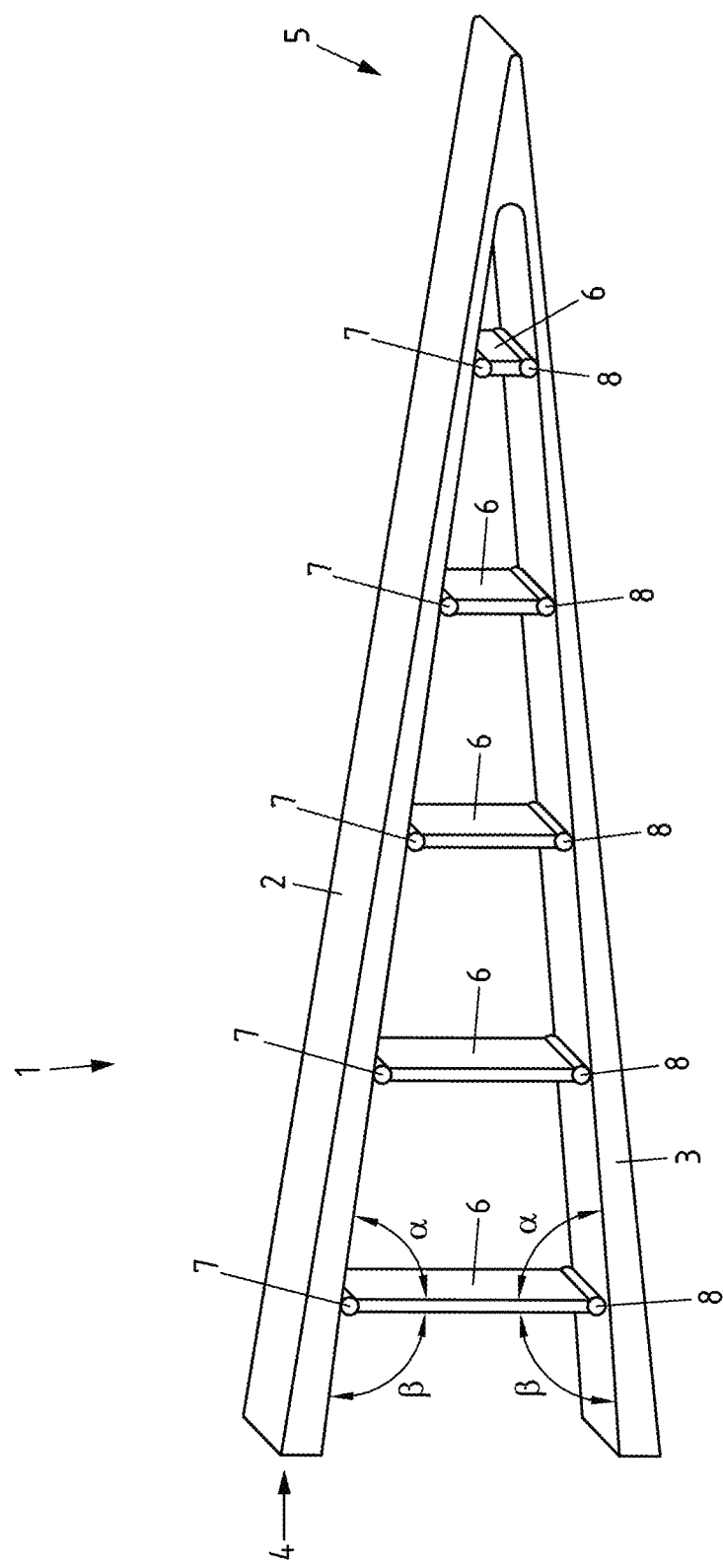
FIG. 1 shows a finger element of a belt conveying device according to the invention and/or for performing the method according to the invention in side view.

In FIG. 1 a finger element 1 which permits an auto-adaptive deformation is shown. The finger element 1 has two flank elements 2, 3 which in the finger element 1, which is shown and in this regard preferred, run together from one end 4 of the finger element 1 to the opposing end 5 of the finger element 1. Additionally, the flank elements 2, 3 approach one another continuously in a longitudinal direction of the finger element 1. Whilst the flank elements 2, 3 are spaced apart from one another at one end 4 of the finger element 1, the flank elements 2, 3 at the other end 5 of the finger element 1 are directly connected together. Thus, a finger element 1 which tapers and runs conically in one direction is obtained.

Webs 6 are provided between the flank elements 2, 3 so as to be distributed over the length of the finger element 1, via which the flank elements 2, 3 are connected together. In the finger element 1, which is shown and in this regard preferred, the webs 6 are connected via joints at both opposing ends 7, 8 in an articulated manner to the flank elements 2, 3. Alternatively, the webs 6 could be flexibly configured. The webs 6 in the finger element 1, which is shown and in this regard preferred, are distributed at equal spacings over the length of the finger element 1. However, this is not absolutely necessary. It is also not absolutely necessary that the webs 6, as in the finger element 1 shown, run parallel to one another. It is preferred, however, that the webs 6 form with each of the flank elements 2, 3 an acute angle α on one side and an obtuse angle β on the opposing side.

Figure 2A:
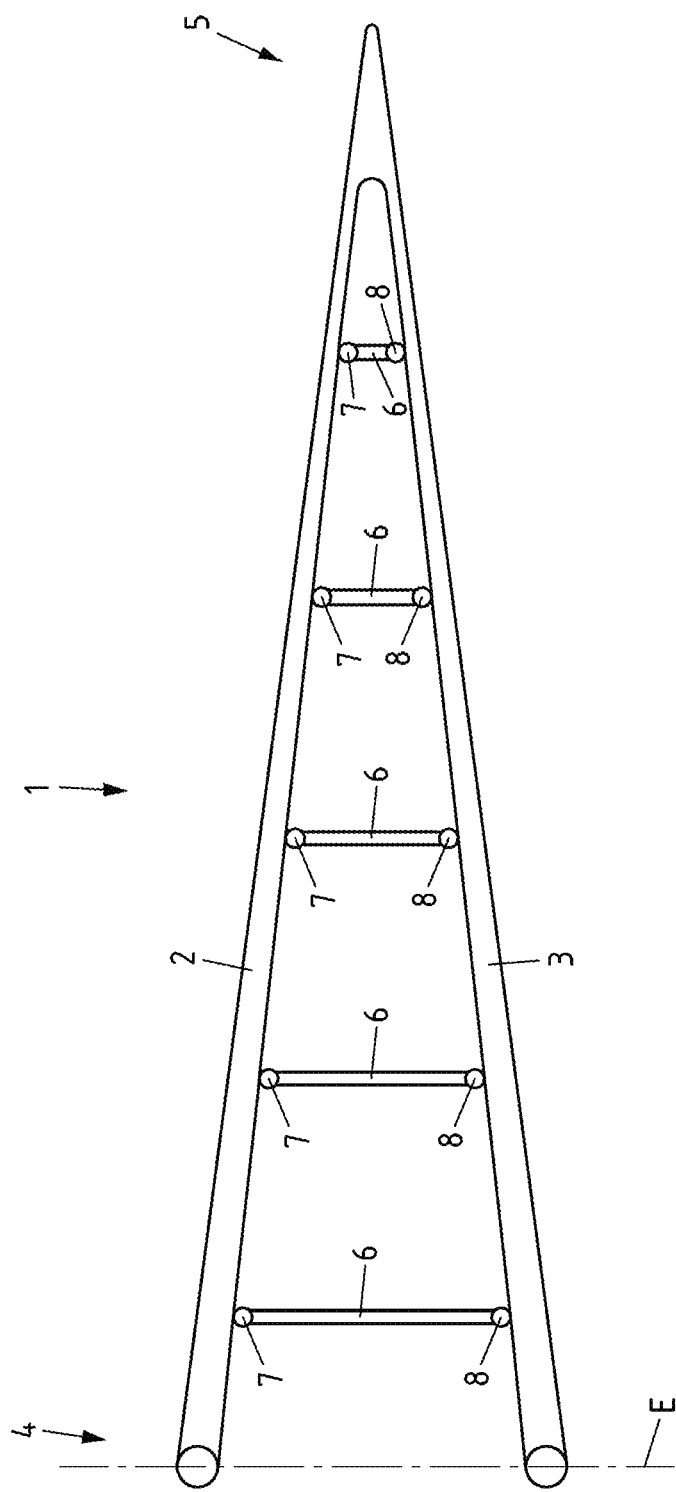
Figure 2B:
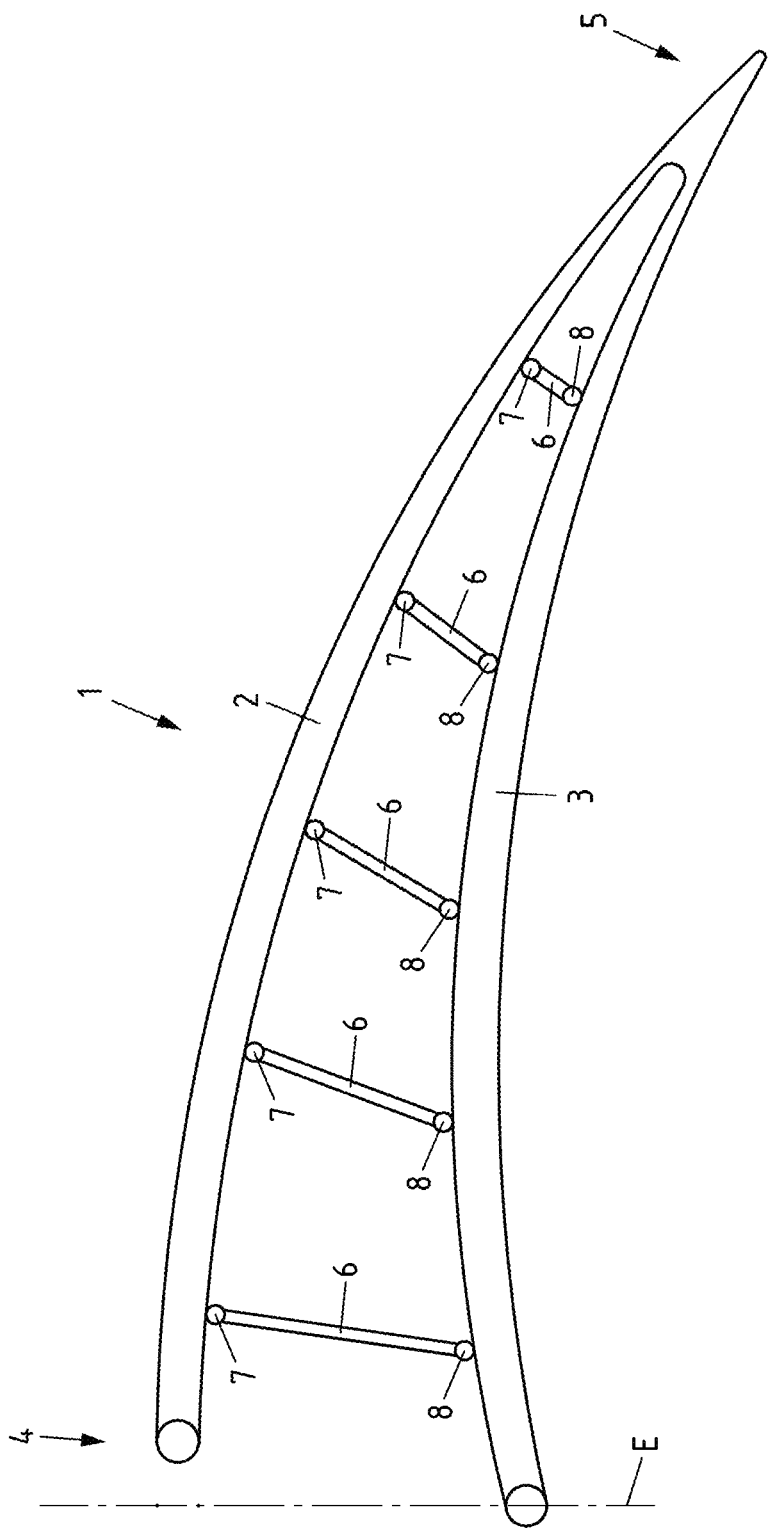

The flank elements 2, 3, which are shown and in this regard preferred, are flexibly configured so that the flank elements 2, 3 may be bent about an axis perpendicular to the longitudinal extension of the finger element 1, which is shown in particular in FIGS. 2A-C. To this end it is expedient if the flank elements 2, 3 are formed from a flexible plastics material or, for example, rubber. The webs 6 may also be formed from plastics or, for example, from a metal since the webs 6 do not have to have any flexibility. In FIG. 2A, the finger element 1 of FIG. 1 is shown in an initial position in which the finger element 1 is in an extended orientation, wherein the free ends of the flank elements 2, 3 are arranged in one plane E. In the finger element 1, which is shown and in this regard preferred, in this position the flank elements 2, 3 are configured at least substantially symmetrically to one another.

If according to FIG. 2B relative to the initial position the free end of the upper flank element 2 is now displaced to the front out of the plane E shown in the longitudinal direction of the finger element 1, the finger element 1 curves downwardly as a result of the connection of the flank elements 2, 3 via the plurality of webs 6. In this manner the end 5 of the finger element 1, which is shown to the right, is adjusted downwardly. Similarly, the finger unit 1 according to FIG. 2C is curved upwardly, wherein the corresponding end 5 of the finger element 1 is adjusted upwardly when the free end of the lower flank element 3 in the longitudinal direction of the finger element 1 is displaced from the plane E to the front in the direction of the curving tip of the finger element 1. It may also be seen from FIGS. 2A-C that the webs 6 between the flank elements 2, 3 are inclined in different directions when the finger element 1 is curved.

In order to implement the displacement of the flank elements 2, 3 similar to FIGS. 2A-C, a drive unit, not shown, may be provided. In this case, suitable drive units are known from the prior art. Suitable drive units, for example, may have at least one linear drive. Thus at least one flank element 2, 3 may be adjusted forward and back in a simple manner in the longitudinal direction of the finger element 1.

It is not shown that also more than two, for example at least three or four, flank elements may be provided. For the sake of simplicity, these flank elements may be arranged, in particular, so as to be equally distributed about a longitudinal axis of the finger element. The plurality of flank elements may thus run together into a common point of the finger element, in particular with the free ends thereof. Additionally, or alternatively, preferably in each case the webs may connect together all of the flank elements. The flank elements 2, 3, which are shown and in this regard preferred, are configured to be strip-shaped. However, a plate-shaped or bar-shaped embodiment of the flank elements might also be possible.

The described finger element 1, however, may be adjusted quite differently from that shown in FIGS. 2A-C, and namely according to FIG. 3, which shows an auto-adaptive adjustment of a flank element 2, 3 of the finger element 1, whilst a package 9 presses onto the upper flank element 2 of the finger element and is bent upwardly in some sections at the same time. The corresponding flank element 2 is displaced locally in the direction of the compressive force F inwardly relative to the finger element 1, which as a result of the coupling of the flank elements 2, 3 via the webs 6 leads to the flank element 2 at a different point and namely in the direction of the two ends 10 of the flank elements 1 connected together at the end 5 of the finger unit 5, shown on the left, being curved in the direction of the package 9. As a result, the package 9 is partially encompassed by the finger element 1.

Figure 4:
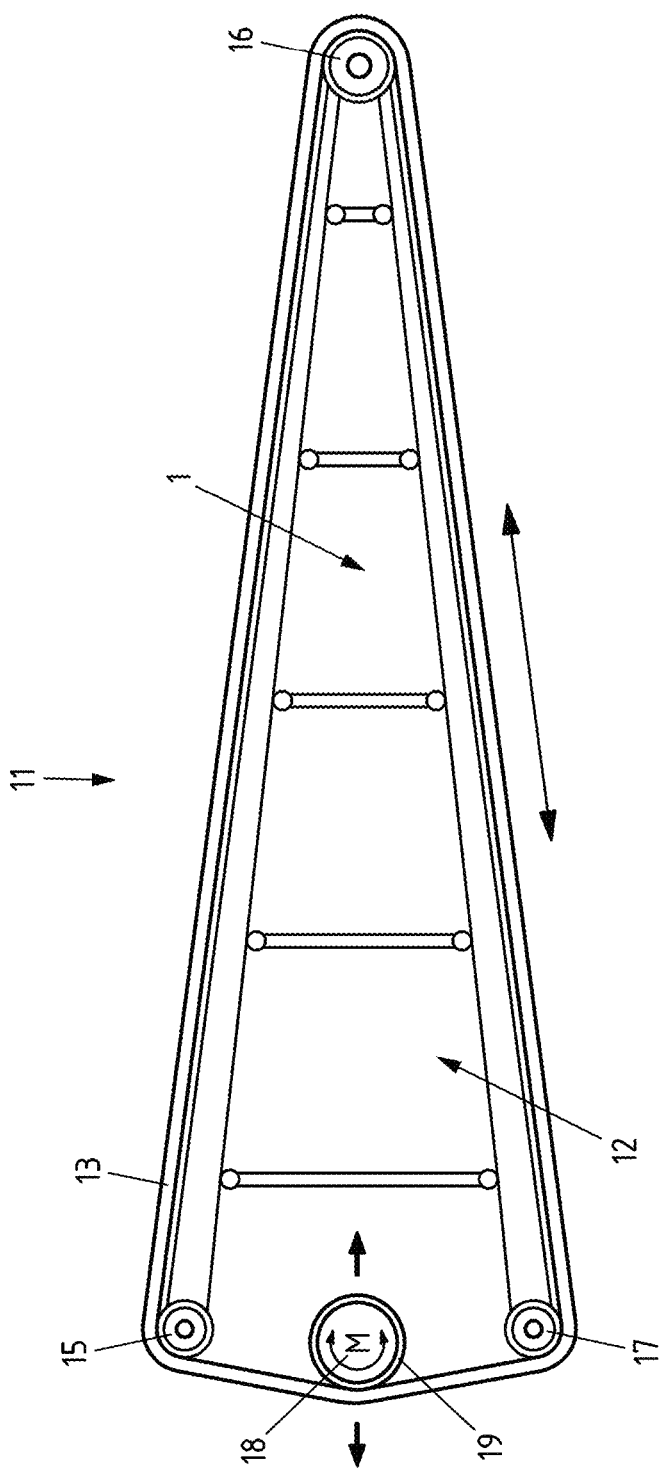
FIG. 4 shows a belt conveying device according to the invention in a schematic side view.

In FIG. 4 a belt conveying device 11 is shown in which the supporting structure 12 of the belt conveying device 11 consists of a finger element 1 according to FIG. 1. The conveyor belt 13 of the belt conveying device 11 runs around the supporting structure 12 and thus around the finger element 1. To this end the belt conveying device 11, which is shown and in this regard preferred, has a plurality of deflecting devices in the form of deflection rollers 15, 16, 17. A deflection roller 15 is provided at the ends 10 of the flank elements 2, 3 connected together, wherein the deflection roller 15 is ultimately borne and supported by the corresponding end 5 of the finger element 1. Moreover, in each case a deflecting device in the form of a deflection roller 16, 17 is provided at the free ends of the flank elements 2, 3. Moreover, a drive 18 is provided, said drive in the belt conveying device 13, which is shown and in this regard preferred, being able to drive the conveyor belt 13 in different directions. The drive 18 is implemented via a drive roller 19 which may be adjusted as required to tension the conveyor belt 13, for example in the longitudinal direction of the finger element 1. Additionally, for a slip-free drive of the conveyor belt 13, a toothing may be provided on the conveyor belt 13, said toothing meshing with a toothing of the drive roller 19. In contrast to the belt conveying device 11, which is shown and in this regard preferred, the supporting structure 12 about which the conveyor belt 13 circulates, may have further supporting structure parts in addition to the finger element 1.

In the belt conveying device 11, which is shown and in this regard preferred, the conveyor belt 13 is guided along the flank elements 2, 3 and namely sufficiently close that the conveyor belt 13 may be pressed by a package 9 against a flank element 2, 3 as required. The finger element 1 in this case may be adjusted in an auto-adaptive or proactive manner relative to the corresponding package 9, as has been already described. In the case of finger element 1 of the belt conveying device 11 shown in FIG. 4, therefore, the flank elements 2, 3 may also be displaced in the longitudinal direction of the finger element 1 relative to one another in order to curve the finger element 1. With the adjustment of an end 5 of the finger element 1 associated therewith in a direction perpendicular to the longitudinal extension of the finger element 1, the conveyor belt 13 and the path thereof around the finger element 1 are also adjusted. If the conveyor belt 13, also in the case of a curved finger element 1, is to be guided at a small spacing from the flank elements 2, 3 along said flank elements, further devices, not shown, for positioning the conveyor belt 13 between the deflection rollers 15, 16, 17 adjoining the flank elements 2, 3 or at least one flank element 2, 3 have to be provided as required.

Figure 5:
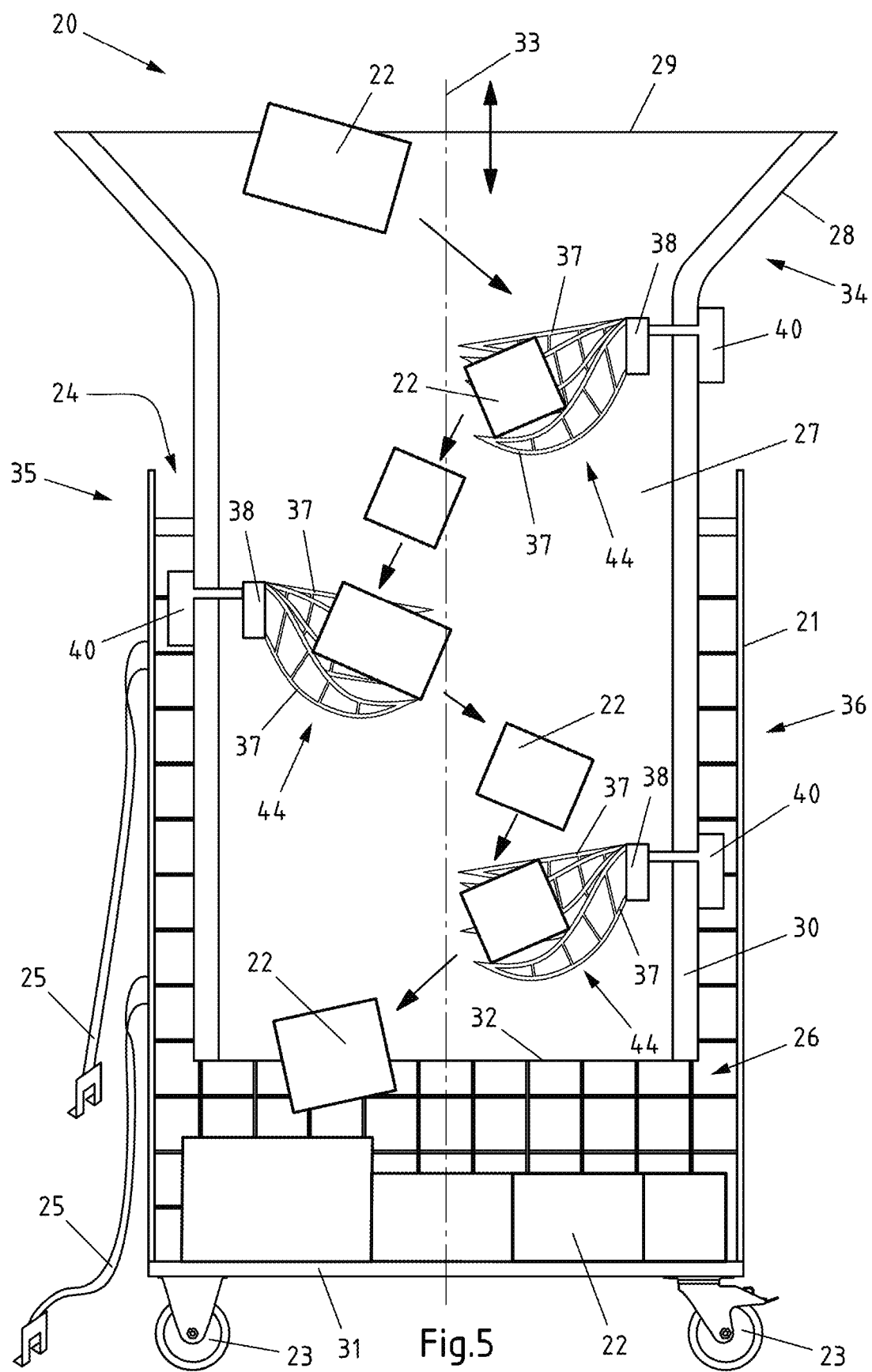
FIG. 5 shows a first loading device according to the invention during the loading of a container in a schematic side view.

In FIG. 5 a loading device 20 for loading a container 21 with packages 22 is shown, whilst a container 21, which is a roll container, is loaded with packages 22 with the loading device 20. The roll container has rollers 23 in order to be able to move the container 21. Additionally, the container 21 is open to the top and to the front. Whilst the upper end 24 in the container 21 may not be closed, belts 25 which may be tensioned over the front face 26 of the container 21 in order to avoid the situation where packages 22 drop out inadvertently, are provided on a side of the container 21. For the sake of greater clarity, the belts 25 in FIG. 5 are not tensioned over the front face 26 to the opposing side even if in principle this might be expedient during the loading of the container 21. As an alternative to the belts 25, at least one door or at least one flap or at least one apron could also be provided, by which the front face 26 may be closed to a sufficient extent that a situation where the packages 22 drop out is avoided. Moreover, as already has been described in the introduction, other containers, which may be configured as roll containers but do not have to be, may also be used.

The loading device 20, which is shown and in this regard preferred, comprises a transport channel 27 which is configured in the form of a tube and thus has a circular cross section. However, this is not necessarily the case. For example, a rectangular, square or oval cross section could also be provided. Additionally, in the loading device 20, which is shown and in this regard preferred, a funnel-shaped section 28 which tapers downwardly is provided on an upper section of the transport channel 27. The upper end of this upper section forms an inlet 29 for supplying the packages 22 to the transport channel 27. When loading the container 21 with packages 22 in the exemplary embodiment of the loading device 20, which is shown and in this regard preferred, additionally a lower section 30 of the transport channel 27 is located in the container 21 to be loaded which has packages 22 only in the region of the base 31. At the lower end of the lower section 30 of the transport channel 27 an outlet 32 for the packages 22 is provided for supplying the packages 22 into the container 21. As the container 21 is filled with packages 22, the lower section 30 of the transport channel 27, in particular, may be pulled out in a stepwise manner upwardly and thus increasingly out of the container 21. As required, the lower section 30 of the transport channel 27 when loading the last packages 22 and/or when the container 21 is almost filled, is pulled out of the container 21 as a whole.

In the loading device 20, which is shown and in this regard preferred, the transport channel 27 is oriented perpendicularly. Thus, the central line 33 of the transport channel 27 is provided at least substantially parallel to the direction of gravity. This has proved to be space-saving but not in any way absolutely necessary. For example, the central line 33 could be inclined relative to the direction of gravity. In principle, it might be less preferred but conceivable if the central line 33 of the transport channel 27 might also extend approximately in a zig-zag shaped manner to and fro from one side to the other side and namely in the transport direction of the packages 22.

Three finger positions 34, 35, 36 are arranged in the direction of gravity between the inlet 29 of the transport channel 27 for supplying packages 22 and the outlet 32 of the transport channel 27 for the exit of the packages 22 in the direction of the container 21, in each case a plurality of finger elements 37 being provided at said finger positions. In the present case, in each case five finger elements 37 are provided at a finger position 34, 35, 36. However, only one finger element 37 or for example two, three of four finger elements 37 could also be provided in each case. Any other number of finger elements 37 might also be conceivable as it is also conceivable that the number of finger elements 37 varies from finger position 34, 35, 36 to finger position 34, 35, 36 if this should prove expedient. This could possibly be the case if the transport channel 37 tapers conically from its inlet 29 to its outlet 32. Then there is always increasingly less space present for the finger elements 37 downwardly.

In the loading device 20, which is shown and in this regard preferred, the finger elements 37 are not directly arranged or fixed on the wall of the transport channel 27 which, however, in principle might be possible. Instead, the finger elements 37 of a finger position 34, 35, 36 are held together on a hand surface element 28, wherein the hand surface element 38 may be provided as required such that the hand surface element 38 together with the associated finger elements 37 may be adjusted vertically and/or to the side. This is not necessary, however. Thus, in each case a hand element 39 which may be functionally adapted to the human hand is produced from the finger elements 37 together with the hand surface elements 38.

For loading the container 21, the packages 22 which may be transported thereto by a conveying device are introduced automatically or manually into the upper section of the transport channel 27 and supplied in this manner to the upper inlet 29 of the transport channel 27. The conveying device is preferably a belt conveying device, in particular a telescopic belt conveyor or a so-called sorter. The latter conveying devices may supply the packages 22 separately one after the other and drop the packages into the transport channel 27 without this having to be undertaken by an operator. The packages 22 supplied to the inlet 29 of the transport channel 27 are initially partially centered in the upper funnel-shaped section 28 of the transport channel 27 and then as required come into contact with the finger elements 37 of the hand elements 39 of the uppermost finger position 34.

The finger elements 37 of the uppermost finger position 34 in the exemplary embodiment, which is shown and in this regard preferred, are curved slightly upwardly via an associated drive unit 40 so that the free ends of the finger elements 37 are slightly raised. Thus, a slightly open human hand is recreated, the hand inner surface thereof facing upwardly. The packages 22 come into contact with the hand element 39 which is preset in this manner, wherein the packages 22 are captured to a certain extent. As a result of the weight of the packages 22 the finger elements 37 as a whole are adjusted downwardly, wherein as a result of the fin ray effect the finger elements 37 may be curved further. This curvature causes the finger tips as such to be adjusted upwardly relative to the finger element 37, whilst the finger element 37 as a whole may be adjusted downwardly in order to yield to the weight of the package 22. In this manner the packages 22 are not only braked but also deflected in their direction of movement. In the present case, this deflection takes place in the direction of the hand element 39 of the subsequent finger position 35 in the direction of gravity.

In principle, however, it is not absolutely necessary that the finger elements 37 of the hand element 39 are adjusted by a drive unit 40. For example, in the case that the finger elements 37 in the resting position are oriented in a suitable manner in the transport channel 27 and relative to their construction adapted to the size and the weight of the packages 22, a corresponding drive unit 40 may be superfluous. In this case all of the hand elements 39 of the transport channel 27 may be provided with a drive unit 40 or manage without such a drive unit. It may also be provided that some hand elements 39 of the transport channel 27 are assigned to a drive unit 40 and others are not. Additionally, not all finger positions 34, 35, 36 have to have a hand element 39. It is sufficient if individual or even all finger positions 34, 35, 36 merely have one finger element 37 or a plurality of finger elements 37 as required. In the transport channel 27, which is shown and in this regard preferred, however the finger positions 34, 35, 36 are provided with hand elements 39 as have already been described above for the uppermost finger position 34.

After a package 22 has been braked by the hand element 39 of the uppermost finger position 34 and deflected to the side, the package 22 drops in the direction of the next central finger position 35, wherein the speed of the package 22 increases in free fall. Once arrived at the central finger position 35, the package 22 comes into contact with the hand element 39 of the central finger position 35 and as in the case of the hand element 35 of the uppermost finger position 34 is captured to a certain degree and deflected, and namely in the direction of the lowermost finger position 36. Until the package 22 reaches the lowermost finger position 36, the package 22 accelerates again slightly in the direction of gravity. The hand element 39 of the lowermost finger position 36 brakes the package 22 but in turn, as described, such that the package 22 then drops with moderate speed through the outlet 32 of the transport channel 27 into the container 21. The package 22 thus lands in the container 21 sufficiently gently for the package 22 not to be damaged in any way. To this end, the lowermost finger position 36 in the transport channel 27, which is shown and in this regard preferred, is not spaced apart in the direction of gravity further than 1 m from the outlet 32 of the transport channel 27.

The movement path which the packages 22 specifically take along the transport channel 27 depends on the size and on the weight of the packages 22. The movement path for individual packages 22 may thus deviate from the movement path shown. Thus, it may also arise that, in particular, small but heavy packages 22 do not come into contact with all of the hand elements 39 of a transport channel 27. This may be tolerated as long as these packages 22 are braked sufficiently on their path through the transport channel 27, so that the packages 22 drop sufficiently slowly into the container 21. Otherwise optionally the presetting of the finger elements 37 has to be adapted via the drive unit 40 or, however, the hand elements 39 themselves have to be adapted, i.e., for example to be replaced by longer and stiffer hand elements 39.

Figure 6:
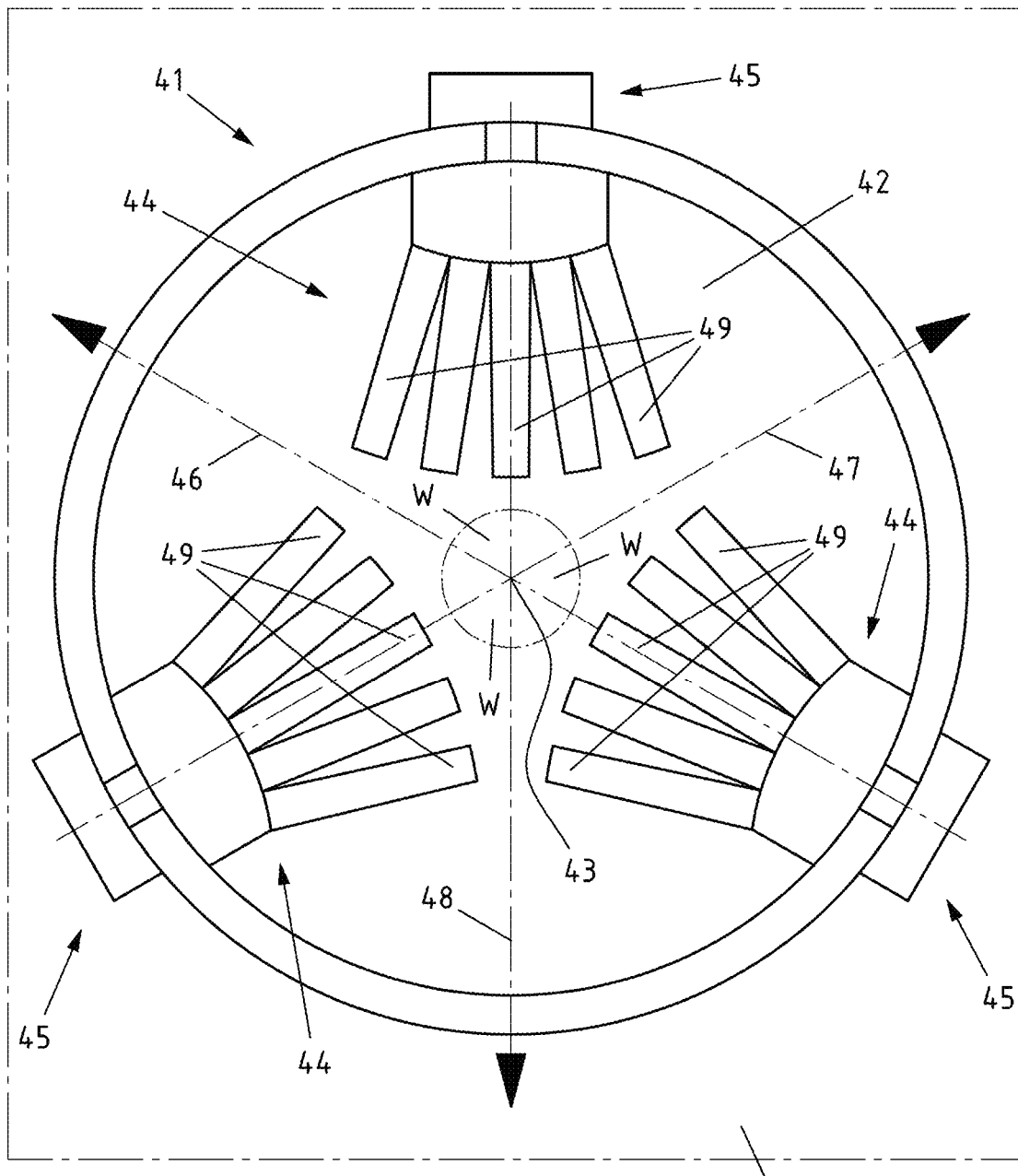
FIG. 6 shows a second loading device according to the invention in a schematic plan view from above.

In FIG. 6 an alternative loading device 41 is shown from above in a schematic plan view. The transport channel 42 has a circular cross section and the central line 43 of the transport channel 42 extends perpendicular to the drawing plane. In the transport channel 42, in contrast to the transport channel 27 of FIG. 5, the hand elements 44 of the finger positions 45 are not arranged opposing one another but offset to a lesser degree laterally from one another. In this case the hand elements 44 of the finger positions 45, however, in each case are still arranged at a vertical spacing from one another. As required, the transport channel 42 shown in FIG. 6 has three or more finger positions 45. If more than three finger positions 45 are provided the hand elements 44 of a plurality of finger positions 45 are provided congruent to one another in the view of FIG. 6.

For each of the hand elements 44 shown, a direction 46, 47, 48 may be defined which takes into account the direction of the finger elements 49 of the hand element 44 in the direction of their free ends and combines the directions to form a common direction of the finger elements 49 of the respective hand element 44. These directions 46, 47, 48 of the successive hand elements 44 may thus project into a cross-sectional plane E of the transport channel 27 which in the present case extends horizontally and parallel to the drawing plane and/or perpendicular to the central line 43. In this projection the above-described directions 46, 47, 48 in the exemplary embodiment, which is shown and in this regard preferred, enclose an angle W which is approximately 120°. In principle, however, other angles are also conceivable, wherein in principle it is preferred if the hand elements 44 are arranged so as to be distributed at least substantially uniformly over the periphery of the transport channel 42.

LIST OF REFERENCE NUMERALS

1 Finger element
2, 3 Flank element
4, 5 Finger element end
6 Web
7, 8 Web end
9 Package
10 End
11 Belt conveying device
12 Supporting structure
13 Conveyor belt
15 Deflection roller
16 Deflection roller
17 Deflection roller
18 Drive
19 Drive roller
20 Loading device
21 Container
22 Packages
23 Rollers
24 End
25 Belts
26 Front face
27 Transport channel
28 Funnel-shaped section
29 Inlet
30 Lower section
31 Base
32 Outlet
33 Central line
34-36 Finger positions
37 Finger element
38 Hand surface element
39 Hand element
40 Drive unit
41 Loading device
42 Transport channel
43 Central line
44 Hand element
45 Finger position
46-48 Directions
49 Finger element
E Cross-sectional plane
W Angle All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. Loading device for loading a plurality of containers, in particular roll containers, one after another with packages, wherein the containers are separate from the loading device, the loading device comprising a transport channel for the transport of the packages one after the other in the direction of a container of the plurality of containers, wherein the transport channel has an upper inlet for the supply of the packages into the transport channel and a lower outlet for the supply of the packages into the container, wherein at least one upper finger position with at least one finger element and at least one lower finger position with at least one finger element are provided in the transport channel, wherein the at least one of the finger elements of the upper finger position and the lower finger position in each case have at least two flexible flank elements extending together from one end of the finger element to the opposing end of the finger element, and wherein in each case the at least two flexible flank elements of the finger elements are flexibly connected together in each case via a plurality of webs, so that the finger elements in each case may be adjusted from at least one curved position into at least one extended position and back.

2. Loading device according to claim 1, characterized in that a plurality of finger elements is provided on at least one finger position, and in that preferably at least one hand element comprising at least some of the finger elements of the plurality of finger elements of the respective finger position is provided on at least one finger position.

3. Loading device according to claim 2, characterized in that the finger elements of the at least one hand element are arranged slightly spreading from one another to the side or running at least substantially parallel to one another, and/or in that the finger elements of the at least one hand element are provided to act together on a hand surface element of the hand element.

4. Loading device according to claim 1, characterized in that at least one drive unit is assigned to at least one finger element of at least one finger position and/or at least one hand element of at least one finger position for adjusting the at least two flank elements of the respective finger element in a longitudinal direction of the finger element relative to one another from a curved into an extended position and/or back and in that preferably at least one drive unit is assigned to all of the finger elements of at least one finger position and/or at least one hand element for adjusting the at least two flank elements of the respective finger element in a longitudinal direction of the finger element relative to one another from a curved into an extended position and/or back.

5. Loading device according to claim 1, characterized in that at least one finger element of at least one finger position and/or at least one hand element, in particular at least one flank element of at least one finger element, is assigned at least one pressure sensor for detecting the pressure exerted on the flank element, the finger element and/or the hand element.

6. Loading device according to claim 1, characterized in that the extension of the at least one finger element and/or hand elements of a finger position in the direction of the associated free end in a projection into a horizontal plane and/or a cross-sectional plane of the transport channel forms an angle of between 45° and 315°, preferably between 90° and 270°, in particular between 135° and 225°, relative to the extension of a finger element and/or hand element of a further finger position in the direction of the associated free end and in that preferably the extension of the finger elements and/or hand elements of, in particular in each case all, successive finger positions in the direction of gravity in the direction of the associated free end in a projection into a horizontal plane and/or cross-sectional plane of the transport channel enclose an angle of between 45° and 315°, preferably between 90° and 270°, in particular between 135° and 225°.

7. Loading device according to claim 1, characterized in that the finger elements and/or hand elements of, in particular successive, finger positions spaced apart from one another in the direction of gravity, are provided on at least substantially opposing inner faces of the transport channel.

8. Loading device according to claim 1, characterized in that the lower and/or lowermost finger position of the transport channel above the lower outlet of the transport channel is spaced apart from the outlet of the transport channel (27) in the direction of gravity by less than 2 m, preferably less than 1.5 m, in particular less than 1 m, further in particular less than 0.5 m.

9. Loading device according to claim 1, characterized in that the transport channel, in particular a central line of the transport channel, is configured to be at least substantially rectilinear and/or in that the transport channel, in particular a central line of the transport channel, has an angle to the direction of gravity of less than 45°, preferably of less than 30°, in particular of less than 15°.

10. Loading device according to claim 1, characterized in that the transport channel is configured at least as an at least substantially closed channel, in particular having at least a substantially rectangular or round cross section, and/or in that a funnel-shaped section, tapering in particular in the direction of gravity and/or in the transport direction of the packages along the transport channel, is assigned to the upper inlet of the transport channel.

11. Method for loading a plurality of containers, in particular roll containers, one after another with packages with a loading device according to claim 1, wherein the containers are separate from the loading device,
   in which the packages are introduced one after the other in the upper inlet of the transport channel,
   in which the packages introduced into the inlet of the transport channel come into contact with the at least one finger element of the upper finger position and are braked by the at least one finger element, in which the packages braked by the at least one finger element of the upper finger position come into contact with the at least one finger element of the lower finger position and are braked by the at least one finger element and in which the packages braked by the at least one finger element of the lower finger position are released from the transport channel into a container of the plurality of containers through the lower outlet of the transport channel.

12. Method according to claim 11, in which the movement direction of the packages at least from the finger elements of the upper finger position and/or the lower finger position is deflected at least partially in a direction perpendicular to the direction of gravity and in which preferably the packages are deflected by at least one finger element and/or hand element of the at least one upper finger position in the direction of the at least one finger element and/or hand element of the at least one lower finger position.

13. Method according to claim 11, in which the braking and/or deflection of the packages takes place by a partial capture by the at least one finger element and/or hand element of the at least one finger position and/or in which the deflection and/or forwarding of the packages, in particular at least partially captured along the transport channel, takes place by an adjustment of the at least one finger element of the finger position and/or the hand element downwardly and/or upwardly and/or by spreading a plurality of finger elements of the finger position and/or the hand element of the finger position and/or in which the packages exiting from the lower outlet of the transport channel drop into the container, in particular roll container, in the direction of gravity.

14. Method according to claim 11, in which during the loading of the container a lower section of the transport channel assigned to the lower outlet of the transport channel is held at least temporarily in a position inserted into the container and in which during the loading of the container preferably the lower section of the transport channel is at least temporarily, in particular in a stepwise manner, and at least partially pulled out of the container.

15. Loading device according to claim 1, wherein the transport channel is configured to be inserted into the container during loading and pulled out of the container after loading.

* * * * *